April 2, 1963   H. M. A. EL-SUM   3,083,615
OPTICAL APPARATUS FOR MAKING AND RECONSTRUCTING HOLOGRAMS
Filed May 16, 1960   3 Sheets-Sheet 1

INVENTOR.
HUSSEIN M A EL-SUM
BY
George Sullivan
Agent

April 2, 1963     H. M. A. EL-SUM     3,083,615
OPTICAL APPARATUS FOR MAKING AND RECONSTRUCTING HOLOGRAMS
Filed May 16, 1960     3 Sheets-Sheet 3

INVENTOR.
HUSSEIN M A EL-SUM
BY
George A Sullivan
Agent

United States Patent Office

3,083,615
Patented Apr. 2, 1963

3,083,615
OPTICAL APPARATUS FOR MAKING AND
RECONSTRUCTING HOLOGRAMS
Hussein M. A. El-Sum, Atherton, Calif., assignor to
Lockheed Aircraft Corporation, Burbank, Calif.
Filed May 16, 1960, Ser. No. 29,415
4 Claims. (Cl. 88—24)

This invention relates generally to optical systems and devices, and more particularly to means and methods for making and reconstructing holograms.

A hologram is the resultant picture obtained in a plane at a distance from an object when the scattered radiation from the object is attended by a strong coherent background radiation. Such a hologram bears no resemblance to the object; yet, it will contain all the information about the object and can be reconstructed by suitable techniques to recover the information about the object in recognizable form. Moreover, the hologram contains not only all of the information about the object but also, all of the information about the whole space between the hologram and the source of radiation; hence from the same hologram any other intervening objects can also be reconstructed.

The theory of holograms and experimental data in regard to their formation and reconstruction has been reported in the literature and detailed information thereof can be found in: (1) The Proceedings of the Royal Society, Section A, Volume 197, 1949, at pages 454–487; (2) Proceedings of the Physical Society, Section B, Volume 64, 1951, at pages 449–469; (3) "The Formation of the Diffraction Image With Electrons in the Gabor Diffraction Microscope," M. E. Haine and T. Mulvey, Journal of the Optical Society of America, Volume 42, Number 10, October 1952, at pages 763–773; and (4) "Image Formation by Reconstructed Wave Fronts. I. Physical Principles and Methods of Refinement," Paul Kirkpatric and Hussein M. A. El-Sum, Journal of the Optical Society of America, Volume 46, Number 10, October 1956, at pages 825–831. Also, further information can be found in Patent No. 2,770,166 to D. Gabor.

A careful examination of available knowledge in the field, as generally represented by the above cited references, will reveal that complicated apparatus is involved or contemplated with regard to making and reconstructing holograms. Particularly, it is indicated that the radiation source which illuminates the object must not only be highly coherent and of monochromatic form but also, must have very small dimensions. In order to achieve this, a considerable number of filters, lenses and prisms are employed in a variety of arrangements, which are quite complex, large, critical and fragile. Also, these filters, lenses and prisms greatly increase the noise introduced into the system because of the extraneous particles, such as dirt and dust which they unavoidably collect and the imperfections inherent in these devices.

In accordance with the present invention, greatly simplified and compact apparatus has been devised for making and reconstructing holograms. This simplified apparatus is possible as a result of the novel system arrangement employed and my discovery that the previously taught requirements as to the source of radiation are not as important as the prior art would indicate, particularly where object recognition is the main feature desired. It has thus become possible by means of the present invention to expand the possibilities of the basic theory to other desirable applications thereof other than microscopy (which is the main direction of previous work in this field), since a simple, portable, non-critical and rugged piece of apparatus for making and reconstructing holograms is now possible for field or other use.

The present invention is chiefly concerned with the novel apparatus which I have devised for making and reconstructing holograms, rather than the applications to which this apparatus can be put. However, many possible applications for this apparatus will be apparent to those skilled in the art.

Accordingly, it is the broad object of this invention to provide simplified means and methods for making and reconstructing holograms.

A more specific object of this invention is to provide apparatus for making and reconstructing holograms which is simple, compact, non-critical, rugged, and can conveniently be employed for field use.

An additional object is to provide apparatus for making and reconstructing holograms which can be conveniently and rapidly operated with a minimum of technical skill.

The specific nature of the invention, as well as other advantages, objects and uses thereof, will clearly appear from the following description and the accompanying drawing in which.

Like numerals designate like elements throughout the figures of the drawing.

Figure 1:
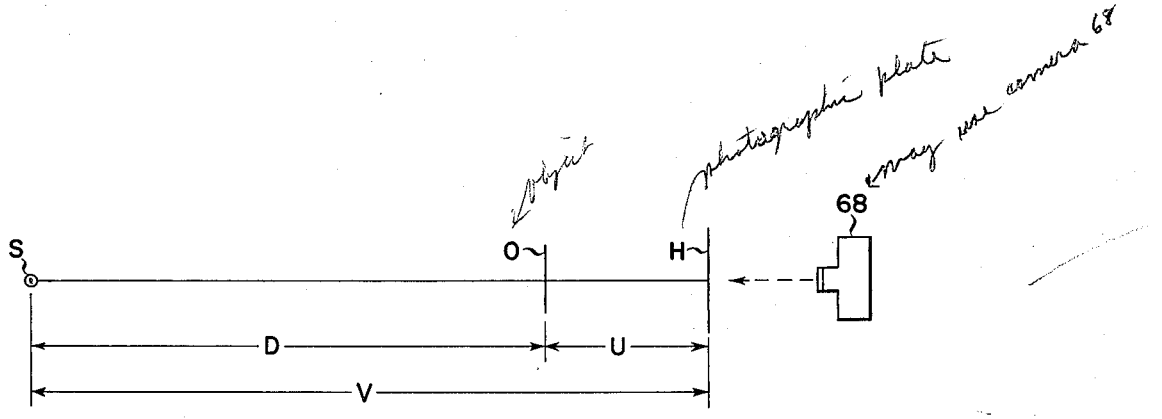
FIG. 1 is a schematic diagram which will be employed to explain the basic technique of making and reconstructing holograms.
Figure 2:
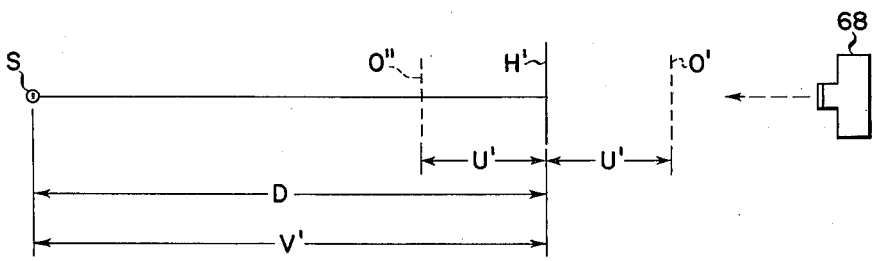
FIG. 2 is a schematic diagram of a preferred arrangement of reconstructing holograms, in accordance with the invention.

The basic geometrical arrangement for making and reconstructing holograms is well known in the art, as will be seen from the previously cited references. FIGS. 1 and 2 diagrammatically illustrate the operation of a typical geometrical arrangement.

In FIG. 1 S represents the source of radiation, O represents an object at a distance D from the source, and H represents a photographic plate at a distance U from the object O. The distance between the source S and the photographic plate H is designated as V. The source S is chosen so that the radiation falling on the photographic plate H substantially consists of the scattered radiation from the object O attended by a strong coherent background radiation. The resulting picture obtained on the photographic plate H, therefore, will be a hologram of the object O. Also, if there are any other objects between the source S and the photographic plate H, a composite picture will be obtained in which the holograms of these objects appear on the photographic plate H superimposed on the hologram of the object O.

The hologram obtained for the object O may be conventionally considered as having an equivalent focal length $f$ expressed in terms of the distances U and V as follows:

$$f = \frac{VU}{V-U} \qquad (1)$$

The photographic plate H containing the hologram of the object O is now developed and a transparency is made which will be designated as H'. This transparency is used to reconstruct an image of the object O. It will be appreciated that if so desired, the photographic plate H may be omitted and instead, a camera 68 may be employed which is focused at the same plane at which the plate H was previously located.

In reconstructing an object from its hologram, the important requirement is to employ a wave front of substantially the same shape as the original one which formed the hologram. In regard to the arrangement of FIG. 1 this means that in the reconstruction arrangement, the product of $f\lambda$ should be the same as in the FIG. 1 arrangement, $\lambda$ being the wavelength of energy radiated from the source employed.

The most direct way of reconstructing an image of the object, therefore, is to use the identical arrangement of FIG. 1 with the object O and the plate H removed and the transparency H' located at the same plane as was the plate H in making the hologram. Two reconstructed images of the object will then be obtained, a conjugate image O" at the location of the original object O, and a real image O' on the opposite side of the transparency H' at the same distance U therefrom. If the camera 68 is focused to the plane of either of these images and a picture taken, the resultant picture obtained will be an image of the object O. Because the conjugate image O" is much closer to the source, however, the picture obtained by focusing on this conjugate image O" is usually of poor quality, and it is ordinarily more desirable to focus on the real image O'. Also, the real image O' is preferable because it is magnified with respect to the conjugate image O". It should additionally be noted that a photographic plate could be used instead of the camera 68 at the location of the real image O', but because it would block out the source S could not be used at the conjugate image O".

It is not always desirable to place the transparency H' at the same location as the photographic plate H when the hologram was made as in the above illustration. In the simplified apparatus which I have devised in accordance with the present invention, it is advantageous to place the transparency H' at the same location at which the object O was placed in making the hologram. Such a geometrical arrangement is diagrammatically illustrated in FIG. 2, which shows the transparency H' at the same distance D from the source S as was the object O in FIG. 1. The distance between the transparency and the source V' is thus equal to D.

Two reconstructed images of the object O' and O" are now obtained at a distance U' from the transparency H' at opposite sides thereof as shown in FIG. 2. The distance U' may be determined from the previously mentioned requirement that the product of $f\lambda$ should remain constant in both the making and reconstructing arrangements employed, shown in FIGS. 1 and 2, respectively. Since the same source S is used in both FIGS. 1 and 2, it then follows that the equivalent focal length of the arrangement of FIG. 2 which will be designated as $f'$ should be equal to the equivalent focal length $f$ of the arrangement of FIG. 1; that is $$f = f' \qquad (2)$$

Using Equation 1, the above Equation 2 may be expressed in terms of source to hologram distance V and V' in FIGS. 1 and 2, respectively, and object to hologram distance U and U' in FIGS. 1 and 2, respectively, as follows:

$$f = \frac{VU}{V-U} = \frac{V'U'}{V'-U'} = f' \qquad (3)$$

which is the general equation for any values of V, U, V' and U' where the wavelengths $\lambda$ of the sources employed are equal. Since the focal length $f$ of the FIG. 1 arrangement is known, and $V' = D$ in FIG. 2, Equation 3 may be written as $$f = \frac{DU'}{D-U'} \qquad (4)$$

The distance U' from the transparency H' at which the images O' and O" appear may then be expressed as follows:

$$U' = \frac{fD}{D-f} \qquad (5)$$

In order to obtain a picture of either of the images O' and O", the camera 68 is now focused at the distance U' from either side of the transparency H', U' being determined from Equation 5.

It will be understood from Equation 5 that the distance U' may vary within wide limits, depending upon the values of $f$ and $D$. In order to achieve simplicity and compactness and permit the same reconstruction arrangement to be used for a wide range of equivalent focal lengths $f$ used in making the hologram, it is important that the distance D be relatively large, particularly where the camera is to focus on the real image, or where a photographic plate is to be used.

Figure 4:
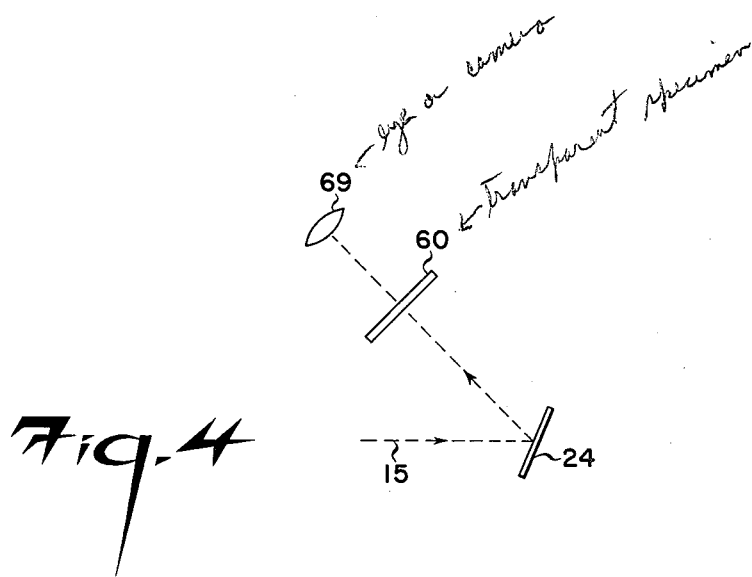
FIGS. 3 and 4 are schematic diagrams of apparatus for making and reconstructing holograms in accordance with the invention.
Figure 3:
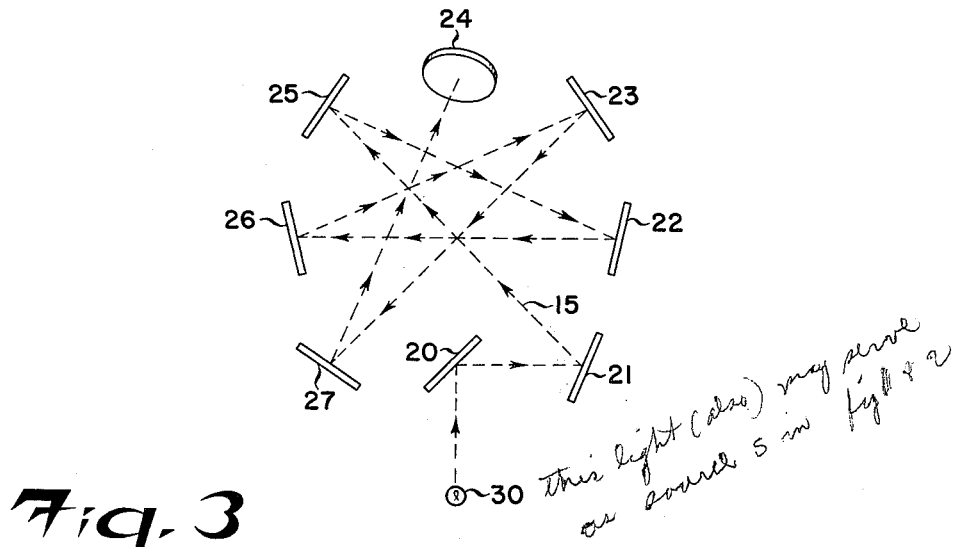

In accordance with the present invention apparatus has been devised which not only provides a relatively large distance D in a simple and compact manner but also, permits a cheap, simple and non-critical source to be employed, which may be nothing more than a small light bulb, the wavelength of which is taken as the average wavelength of the light emitted by the bulb. FIGS. 3 and 4 are schematic diagrams illustrating preferred apparatus for making and reconstructing holograms in accordance with the invention.

In FIG. 3, the numerals 21, 22, 23, 24, 25, 26 and 27 designate eight flat mirrors from which the light from a source 30 is reflected, the flat mirrors 21-27 being located in a generally circular arrangement with their faces oriented so that the light from the source 30 follows the path indicated by the dashed arrows 24. It can be seen that the light from the source 30 first passes to a first mirror 20 which reflects the light to a second mirror 21, and then to the mirrors 25, 22, 26, 23, 27, in that order, and finally to the mirror 24. All of the mirrors have their faces perpendicular to the same plane except for the last mirror 24 whose face is at an angle thereto.

FIG. 4 is a view taken so that the mirror 24 appears as an edge. From FIG. 4 it can be seen that after reflection from the mirror 24, the light passes through a transparent specimen 60 to a lens 69 which may be the lens of a camera or just a viewing lens. Alternatively, a photographic plate (not shown) could be substituted for the lens 69. In fact the lens 69 may be just the eye itself.

The apparatus diagrammatically shown in FIGS. 3 and 4 operates to make and reconstruct holograms as was described in connection with FIGS. 1 and 2. The transparent specimen 60 serves as the object O in the FIG. 1 arrangement for making holograms, as the hologram transparency H' in the FIG. 2 arrangement for reconstructing holograms, and the light 30 in FIG. 3 serves as the source S of FIGS. 1 and 2.

It will now be evident that the light impinging on the transparent specimen 60 will effectively have travelled a distance D corresponding to the total path 15 indicated in FIGS. 3 and 4 which because of the reflecting mirrors 20-27 may be made quite large, even though the volume necessary to achieve this large distance is relatively small.

The requirement of a relatively large light-travel distance D is thus achieved in the simple and compact manner shown in FIGS. 3 and 4. Preferably, the number of mirrors employed should be sufficient so that the effective distance D between the source 30 and the specimen 60 is very much larger than the distance U' between the specimen 60 and the plane at which the hologram is made or reconstructed, for example a ratio of D/U' of 10 to 1.

Also, I have found that it is not necessary to use a monochromatic source of very small dimensions in order to obtain satisfactory holograms or reconstructions thereof, and a small light bulb can satisfactorily be employed as the source 30 for most purposes.

Figure 5:
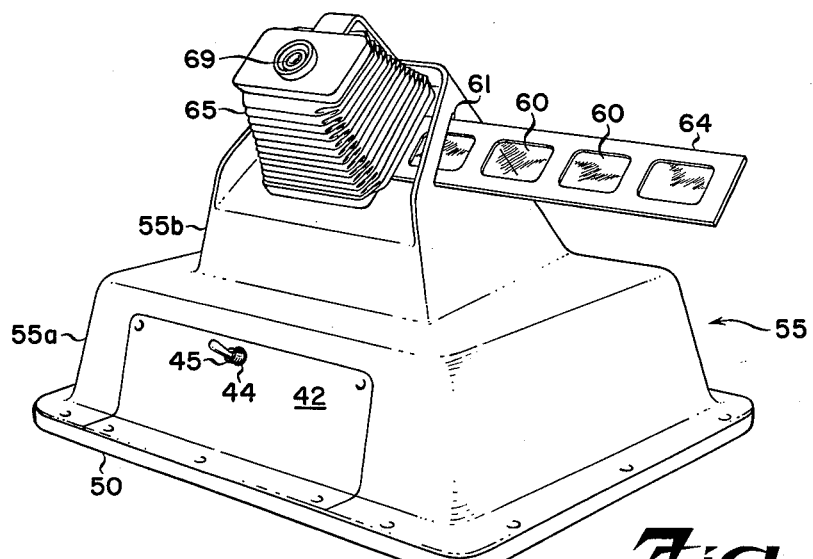
FIG. 5 is a pictorial view of a specific embodiment of apparatus for making and reconstructing holograms in accordance with the invention.
Figure 6:
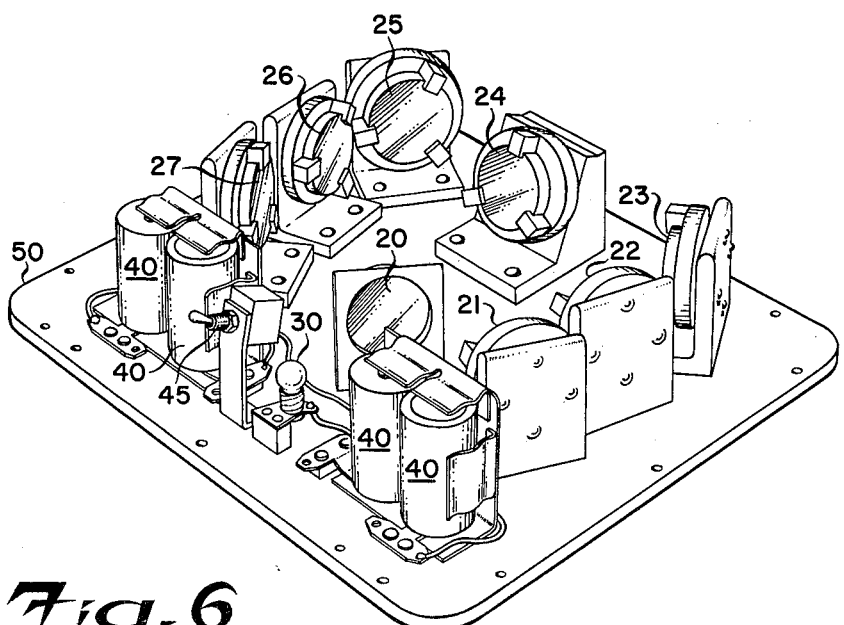
FIG. 6 is a pictorial view of a portion of the appartus of FIG. 5 with the outer casing removed.

FIGS. 5 and 6 are pictorial views of a specific embodiment of the apparatus diagrammatically illustrated in FIGS. 3 and 4 which clearly reveals the simplicity and compactness that can be achieved in accordance with this invention. As shown in FIG. 6, which is a view of the apparatus of FIG. 5 with the outer casing 55 removed, the flat mirrors 20–27 are suitably mounted to a bottom plate 50 in a generally circular arrangement, the faces of all the mirrors except the mirror 24 being substantially perpendicular to the plane of the bottom plate 50 and oriented to provide the light path shown in FIG. 3. The face of the mirror 24 is tilted upward so as to direct the light reflected therefrom in an upward direction at a desired angle from the plate 50 as shown in FIG. 4.

As shown in the specific embodiment of FIG. 6, the source 30 is a small light bulb wired in series with a switch 45 and the batteries 40, all of which are mounted to the bottom plate 50. When the switch 45 is closed, therefore, the bulb 30 will be lit by current flow therethrough from the batteries 40.

In FIG. 5, the casing 55 to which the bottom plate 50 is mounted comprises a lower portion 55a of box-like shape and a tapered upper portion 55b. An adjustable bellows 65 having a viewing lens 69 on one end thereof, has its other end mounted to the tapered upper portion 55b so that the lens 69 is in the path of the light reflected from the mirror 24. Slots 61 (only one being shown in FIG. 5) are then provided on opposite sides of the tapered upper portion 55b to permit transparent specimens 60 in a suitable holder 64 to be conveniently inserted in the path of the light between the lens 69 and the mirror 24 as diagrammatically shown in FIG. 4. The viewing lens 69 is removable so that a camera or a photographic plate may be substituted in its place if so desired.

The lower portion 55a of the casing 55 surrounds the flat mirrors 20–27, the batteries 40 and the switch 45, all of which are suitably mounted to the bottom plate 50. In order to permit easy access to the batteries 40, a removable plate 42 is provided in the side of the lower portion 55a adjacent the batteries 40. Also, a hole 44 is provided in the removable plate 42 to permit the activating member of the switch 45 to pass therethrough. It should be noted that since the mirrors 20–27 are completely enclosed the chances of dust and dirt collecting thereon are greatly reduced.

The operation of the specific apparatus of FIGS. 5 and 6 for making and reconstructing holograms will now become evident. A transparent specimen 60 of the object is placed in the holder 64 and fed through the slots 61 into the path of the light reflected from the mirror 24 as illustrated in FIG. 4. The lens 69 is replaced by a photographic plate and the bellows 65 adjusted so that the distance U between the specimen and the plate is at a desired value. The plate is then exposed by closing the switch 45 to light the bulb 30. The resultant picture obtained on the photographic plate will then be a hologram of the object.

Although the apparatus of FIGS. 5 and 6 is convenient for making holograms, its greatest value is that it permits a wide variety of holograms to be reconstructed, the image of the object being viewable by means of the lens 69, or a picture taken by a photographic plate or camera substituted therefor. In employing the apparatus of FIGS. 5 and 6 for reconstructing holograms, a transparent specimen 60, which is a transparency of the hologram to be reconstructed, is placed in the holder 64 and inserted through the slot 61 into the path of light between the mirror 24 and the lens 69 in the same manner as an object specimen is inserted when the apparatus is used for making holograms. The bellows 65 is then adjusted so that the plane on which the lens 69 is focused is the plane at which the real image O' appears; that is, the product of $f\lambda$ in the apparatus is made equal to $f\lambda$ of the system in which the hologram was made. As long as this requirement is substantially fulfilled, a reconstructed image of the object will be seen through the lens 69, and it is not necessary that the apparatus of FIGS. 5 and 6 be employed for making the hologram which is to be reconstructed. Thus, because of the large distance D which is effectively provided as explained previously, a great variety of holograms made under widely varying conditions and having a wide range of focal lengths can be successfully reconstructed by the simplified apparatus of FIGS. 5 and 6.

Also, since a transparent specimen may comprise a number of superimposed holograms which have different focal lengths and source frequencies and form images at different planes, the apparatus of FIGS. 5 and 6 could reconstruct each of the holograms separately and focus on each by suitable adjustment of the bellows 65 to match the $f\lambda$ product of each hologram.

It will be apparent to those skilled in the art that various modifications and variations can be made in the construction, arrangement and operation of the apparatus described herein without departing from the scope of the present invention as defined in the appended claims.

I claim as my invention:

1. Optical apparatus for reconstructing holograms comprising a flat plate, a light bulb of relatively small dimensions mounted to said plate, means also mounted to said plate for passing a current through said bulb to cause lighting thereof, a plurality of flat mirrors mounted to said plate in a generally circular arrangement having their faces oriented so that the light from said bulb is successively reflected by said mirrors so as to increase the effective distance of travel thereof, all of said mirrors having their faces perpendicular to said plate except for the face of the last mirror to which said light passes which is tilted away from said plate so that the light reflected by said last mirror is directed away from said plate at a predetermined angle, a casing to which said plate is mounted enclosing said bulb, said means and said mirrors, an adjustable bellows having one end mounted to said casing, a viewing lens mounted to the other end of said bellows, said bellows and said lens being constructed and arranged in conjunction with said casing so that the light reflected by said last mirror passes to said lens through said bellows, and means on said casing to permit a hologram transparency to be inserted in the path of the light between said last mirror and said lens, the number of said plurality of mirrors being sufficient so that the length of the path of travel of said light is substantially greater than the distance between said lens and said transparency.

2. Optical apparatus for making and reconstructing holograms comprising a flat plate, a light bulb of relatively small dimensions mounted to said plate, means also mounted to said plate for passing a current through said bulb to cause lighting thereof, a plurality of flat mirrors mounted to said plate in a generally circular arrangement having their faces oriented so the light from said bulb is successively reflected by said mirrors so as to increase the effective distance of travel thereof, all of said mirrors having their faces perpendicular to said plate except for the face of the last mirror to which said light passes which is tilted away from said plate so the light reflected by said last mirror is directed away from said plate at a predetermined angle, a casing to which said plate is mounted enclosing said bulb, said means and said mirrors, an adjustable bellows having one end mounted to said casing, means on said casing for holding a light transparent element in a position so it intercepts the light reflected from said last mirror, means for sensing the light passing through said element, said last mentioned means mounted on the other end of said bellows, the number of said plurality of mirrors being sufficient so that the length of the path of travel of said light is substantially greater than the distance between said last mentioned means and said element.

3. The apparatus of claim 2 wherein said last mentioned means is a viewing eyepiece.

4. The apparatus of claim 2 wherein said last mentioned means is a camera.

References Cited in the file of this patent

UNITED STATES PATENTS

| | | |
|---|---|---|
| 1,980,287 | Ogden | Nov. 13, 1934 |
| 2,098,928 | Wenczler | Nov. 9, 1937 |
| 2,466,455 | Luboshez | Apr. 5, 1949 |
| 2,711,669 | Erban | June 28, 1955 |
| 2,907,958 | Skaggs | Oct. 6, 1959 |
| 2,933,978 | Rosenthal | Apr. 26, 1960 |
| 2,982,176 | Kay | May 2, 1961 |